US009778923B2

(12) United States Patent
Kochhar et al.

(10) Patent No.: US 9,778,923 B2
(45) Date of Patent: Oct. 3, 2017

(54) PEOPLESOFT CLOUD MANAGER

(71) Applicant: Oracle International Corporation, Redwood Shores, CA (US)

(72) Inventors: Harmeet Kochhar, Bangalore (IN);
Prashant Khandelwal, Bangalore (IN);
Pawan Kumar, San Ramon, CA (US);
Saikat Mitra, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 247 days.

(21) Appl. No.: 14/824,212

(22) Filed: Aug. 12, 2015

(65) Prior Publication Data
US 2017/0046143 A1 Feb. 16, 2017

(51) Int. Cl.
G06F 9/44 (2006.01)
G06F 9/445 (2006.01)
G06F 17/30 (2006.01)

(52) U.S. Cl.
CPC ............... G06F 8/60 (2013.01); G06F 8/70 (2013.01); G06F 17/303 (2013.01)

(58) Field of Classification Search
CPC ............ G06F 8/60; G06F 8/70; G06F 17/303
USPC ............... 707/694, 695, 802, 803, 809;
717/101–103, 106, 107, 174–177
See application file for complete search history.

(56) References Cited

U.S. PATENT DOCUMENTS

| 7,617,175 | B1 * | 11/2009 | Mouton, Jr. ........ G06F 11/1433 |
| 9,098,364 | B2 * | 8/2015 | Davis .................. G06F 8/60 |
| 9,563,655 | B2 * | 2/2017 | Chen .................. G06F 17/30371 |
| 9,612,765 | B2 * | 4/2017 | Huang .................. G06F 3/0647 |
| 9,612,767 | B2 * | 4/2017 | Huang .................. G06F 3/0647 |
| 2003/0028555 | A1 * | 2/2003 | Young .................. G06F 17/303 |
| 2003/0192028 | A1 * | 10/2003 | Gusler .................. G06Q 10/10 717/101 |
| 2005/0010919 | A1 * | 1/2005 | Ramanathan ............. G06F 8/61 717/174 |
| 2006/0195436 | A1 * | 8/2006 | Levesque .................. G06F 8/71 |

(Continued)

OTHER PUBLICATIONS

Lim et al., "A Policy-based Approach for Assuring Data Integrity in DBMSs," 6th International Conference on Collaborative Computing: Networking, Applications and Worksharing, IEEE, Oct. 9-12, 2010.*

(Continued)

Primary Examiner — Wei Zhen
Assistant Examiner — Andrew M Lyons
(74) Attorney, Agent, or Firm — Trellis IP Law Group, PC

(57) ABSTRACT

A method and system for promoting software code from a source database instance to a target database instance distributed amongst a plurality of networked servers is described. Software code migration information pertaining to software objects associated with the software code, the source database instance, and the target database instance is analyzed to determine whether errors associated with migrating the software code exceeds a predefined acceptance threshold. Such code migration information is further analyzed to determine whether migrating the software code from the source database instance to the target database instance will result in unacceptable data loss including disassociation, deletion, or change to data, or result in unacceptable non-data criteria before, during, or after the software code is migrated.

20 Claims, 13 Drawing Sheets

(56) References Cited

U.S. PATENT DOCUMENTS

| | | | | |
|---|---|---|---|---|
| 2007/0143373 A1* | 6/2007 | D'Souza | G06F 17/303 | |
| 2009/0307650 A1* | 12/2009 | Saraf | G06F 8/65 | |
| | | | 717/101 | |
| 2012/0117532 A1* | 5/2012 | Knepper | G06F 8/60 | |
| | | | 717/101 | |
| 2012/0330911 A1* | 12/2012 | Gruenheid | G06F 17/30303 | |
| | | | 707/694 | |
| 2013/0074038 A1* | 3/2013 | Fox | G06F 8/70 | |
| | | | 717/122 | |
| 2013/0117289 A1* | 5/2013 | Fischer | G06F 17/303 | |
| | | | 707/756 | |
| 2013/0212562 A1* | 8/2013 | Fox | G06F 8/65 | |
| | | | 717/120 | |
| 2013/0339943 A1* | 12/2013 | Mallya | G06F 8/60 | |
| | | | 717/176 | |
| 2014/0173559 A1* | 6/2014 | Tiwari | G06F 8/31 | |
| | | | 717/122 | |
| 2014/0208290 A1* | 7/2014 | McGillin | G06F 8/51 | |
| | | | 717/106 | |
| 2014/0344313 A1* | 11/2014 | Gau | G06F 17/303 | |
| | | | 707/810 | |
| 2014/0344778 A1* | 11/2014 | Lau | G06F 17/30292 | |
| | | | 717/106 | |
| 2015/0019488 A1* | 1/2015 | Higginson | G06F 17/303 | |
| | | | 707/634 | |
| 2015/0363396 A1* | 12/2015 | Sengupta | G06F 17/303 | |
| | | | 707/609 | |
| 2016/0142261 A1* | 5/2016 | Huang | G06F 3/0647 | |
| | | | 709/223 | |

OTHER PUBLICATIONS

Scherzinger et al., "ControVol: A Framework for Controlled Schema Evolution in NoSQL Application Development," 31st International Conference on Data Engineering, IEEE, Apr. 13-17, 2015.*

* cited by examiner

PEOPLESOFT CLOUD MANAGER

BACKGROUND

Exemplary implementations are directed to a method and system for providing database software code promotion from software development to end user environments.

Conventional software code promotion, also referred to as software code migration, from a pre-production environment to a production environment generally involves software developers generating source code for deployment in an end user production environment. Such source code is often developed in response to an end user's requirements. However, due to customer compliance and design requirements that are often difficult or costly to automate due to rapidly changing customer needs during software development, conventional database software code promotion from a development platform to an end user production environment generally requires several manual checks before the software code is promoted. Such manual checks are generally done to help prevent errors that often occur when an end user implements the new software code in the production environment.

Personnel, such as administrators and quality assurance engineers, usually perform such manual checks in order to validate software code migration from the pre-production development environment to the production environment. Unfortunately, due to the differences in the pre-production environment and the production environment, which are often not accounted for or are overlooked because of human error, software errors, also referred to as "software bugs," often occur when the pre-production code is deployed in the production environment.

While having such personnel as a team to validate the software code promotion provides some adaptability to respond to changes between pre-production and production, such a team of personnel being placed between pre-production and production often leads to lengthy delays and additional costs associated with software code promotion. For example, such validation processes often involve the use of manual change request forms to implement changes to the source code, which adds additional delays, costs, and the potential to introduce software code promotion issues.

To avoid the risks of working directly with production environments, some current systems, such as software emulation environments or "sandboxes," have attempted to overcome this problem between pre and post production code promotion by providing a pre-production environment designed to emulate the production environment. The production environment emulation is generally designed to facilitate a user in finding and resolving errors in the source code before the source code is promoted from the sandbox environment to the live production environment.

Unfortunately, while such sandbox environments have had some success relative to manual testing in the reduction of errors and software bugs, since live production environments are often in development and undergoing rapid change, such emulation environments generally do not accurately match the live production environment leading to errors when the software code is promoted and deployed.

Therefore, a new and improved system and method for software code promotion is desired to overcome the above.

SUMMARY

A method and system for migrating software code from a source database instance to a target database instance, where the source database instance and the target database instance are distributed amongst a plurality of networked servers, such as a Cloud based network is described. Migration information pertaining to software objects associated with the source database instance and the target database instance is analyzed relative to a loss of data threshold to determine whether migrating the software code from the source database instance to the target database instance will result in an unacceptable loss of data associated with the disassociation, deletion, or change to data once the software code is migrated to the target database instance. In addition, the migration information is further analyzed against validation rules to determine if other validation criteria have been met in order to proceed with the software code migration. After migration of at least a portion of the software code, a second comparison of the database objects instantiated in the target database instance is done to validate the software code migration was completed successfully.

In one implementation, software code from a source instance is labeled with a migration identifier to associate the software code with a migration project. Using a pre-migration comparison function, migration information pertaining to source database objects and target database objects associated with the migration project are compared against migration validation rules to determine whether to allow the migration of all, some, or none of the software code from the source database instance to the target database instance. In addition, prior to the software code migration, the pre-migration comparison function may be configured to determine which source database objects and target database objects will be impacted by the software code migration, and create a backup of such source database objects and target database objects that will be impacted by the software code migration.

In another implementation, a data migration engine may be configured to act as an administrative proxy. As an administrative proxy, the data migration engine establishes an encrypted link to the source database instance and the target database instance thereby reducing or eliminating read/write access requirements for users to make changes to the target database instance as part of software code migration. In addition, the data migration engine may be configured to analyze information associated with or pertaining to migrating source code, objects associated with the source code, source database instances, and target database instances in order to manage the safe migration of all or part of the source code from the source database instance to the target database instance. Moreover, using a validation process the data migration engine may be further configured to determine which database objects may be migrated using a set of validation rules, determine which objects need backup prior to code migration, determine what types of database changes are required for the code migration, if such database changes are allowable, and further assess whether based on other factors such software migration is approved, invalid, unwarranted, or is otherwise unacceptable.

A further understanding of the nature and the advantages of particular embodiments disclosed herein may be realized by reference of the remaining portions of the specification and the attached drawings.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION OF EMBODIMENTS

In the following description, numerous specific details are set forth to provide a more thorough description of the specific examples described herein. It should be apparent, however, to one skilled in the art, that one or more other examples and/or variations of these examples may be practiced without all the specific details given below. In other instances, well-known features have not been described in detail so as not to obscure the description of the examples herein. For ease of illustration, the same number labels are used in different diagrams to refer to the same items; however, in alternative examples the items may be different.

A system and method including a source database instance and a target database instance distributed amongst a plurality of networked servers. Prior to migrating software code from the source database instance to the target database instance, code migration information pertaining to software objects associated with the source database instance and software objects associated with the target database instance is analyzed using a pre-migration code comparison process and migration validation rules to determine whether migrating the software code between the source database instance and the target database instance would produce a software code migration result that is wholly or partially acceptable or unacceptable.

For example, in one implementation such pre-migration code comparison process analyzes such code migration pertinent information relative to validation rules to determine whether migrating the software code from the source database instance to the target database instance will result in at least some acceptable or unacceptable disassociations, deletions, or changes to data once the software code is built into a production database.

In other implementations, the pre-migration data comparison process may be used in conjunction with migration validation rules to determine if other migration criterion has been met in order to allow the migration of the software code to occur. For example, a validation rule may be set to check whether an approval signal has been received prior to allowing software code migration to proceed.

Upon migration of the software code, a post-migration data comparison process determines whether the code migration was successful by comparing the database objects and migration pertinent data associated with the code migration project to post-migration validation rules.

Figure 1:
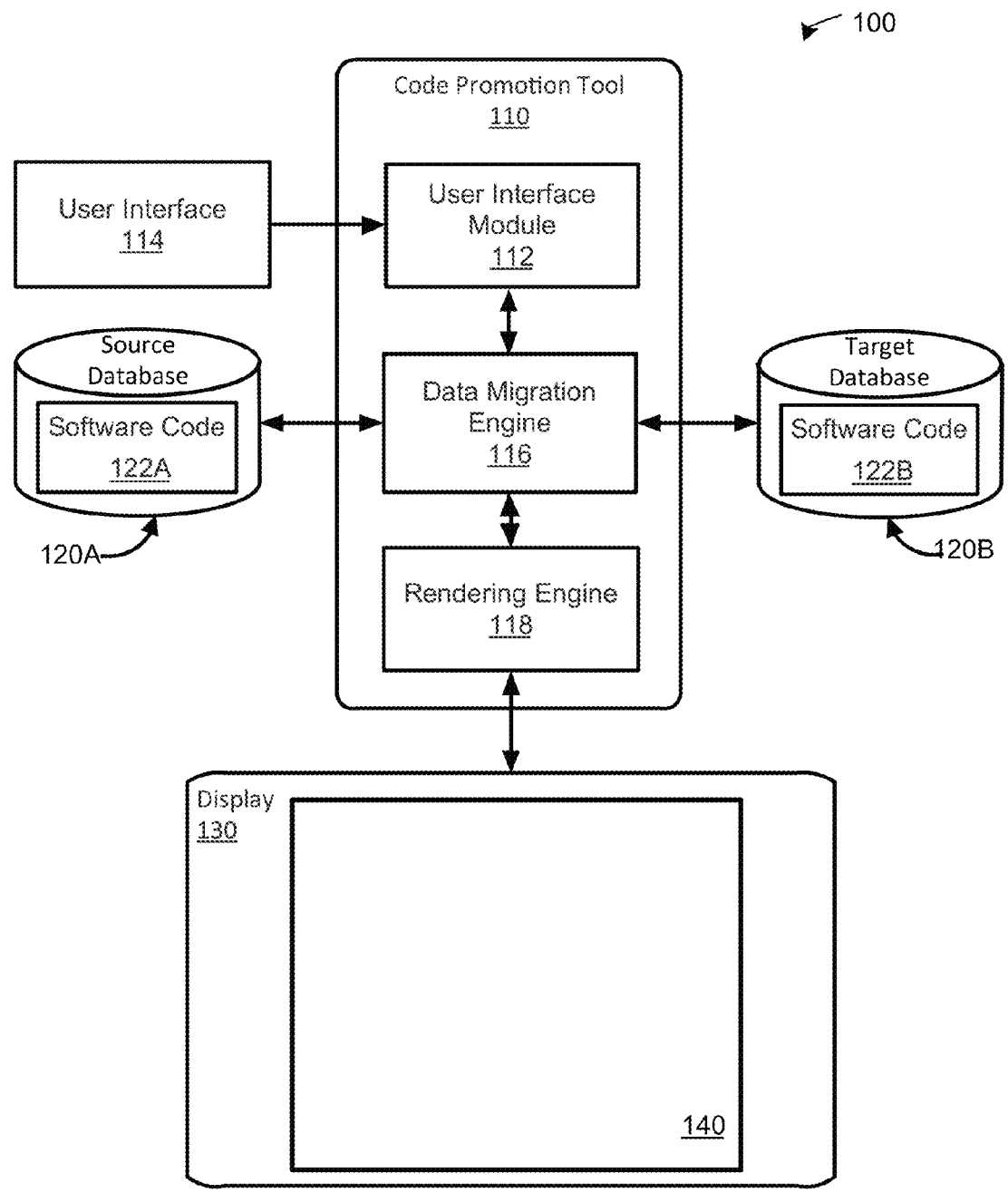
FIG. 1 is a high-level block diagram of an exemplary computing system and graphical user interface used for promoting software code.

FIG. 1 is a high-level block diagram of an exemplary computing system 100 for promoting software code. Computing system 100 may be any computing system, such as an enterprise computing environment, client-server system, cloud network based system, and the like. Computing system 100 includes code promotion tool 110 configured to process data received from user interface 114, such as a keyboard, mouse, etc., with regard to migrating software code from a pre-production environment to a post-production environment, analyzing data objects, data structures, metadata, and information as described herein.

Note that computing system 100 presents a particular example implementation, where computer software code for implementing embodiments may be implemented, at least in part, on a network of servers which form a cloud data processing network. However, embodiments are not limited thereto. For example, a client-side software application may implement code promotion tool 110, or portions thereof, in accordance with the present teachings without requiring communications between the client-side software application and one or more of the network of servers.

In one exemplary implementation, code promotion tool 110 is connected to display 130 configured to display a graphical user interface (GUI) 140, for example, to a user thereof. Display 130 may be a passive or an active display, adapted to allow a user to view and interact with graphical user interface 140 displayed thereon, via user interface 114. In other configurations, display 130 may be a touch screen display responsive to touches, gestures, swipes, and the like for use in interacting with and manipulating graphical user interface 140 by a user thereof. Gestures may include single gestures, multi-touch gestures, and other combinations of gestures and user inputs adapted to facilitate a user in migrating software code.

In other implementations, computing system 100 may include one or more database instances 120 such as source database instance 120A and target database instance 120B. Database instances 120 may be connected to the code promotion tool 110 directly or indirectly, for example via a network connection, and may be implemented as a non-transitory data structure stored on a local memory device, such as a hard drive, Solid State Drive (SSD), flash memory, and the like, or may be stored as a part of a cloud network, as described herein.

Database instances 120 may contain software code 122 such as software code 122A representing software code in a pre-production state, and software code 122B, representing essentially the same software code 12A migrated to a production state. Software code 122 may include software code and associated data and information as described here to be migrated. Software code 122 may also include data pertinent to migration of software code such as data structures, data hierarchy, data migration information, values, summations, algorithms, other types of code, security, hashes, and the like. In addition, software code 122 may also contain other data, data elements, and information such as metadata, labels, development-time information, run-time information, API, interface component information, library information, pointers, and the like.

Code promotion tool 110 may further include user interface module 112, data migration engine 116, and rendering engine 118. User interface module 112 may be configured to receive and process data signals and information received from user interface 114. For example, user interface module 112 may be adapted to receive and process data from user input associated with software code promotion via code promotion tool 110.

In an exemplary implementation, data migration engine 116 may be adapted to receive data from user interface 114 and/or source database instance 120A and target database instance 120B for processing thereof. In one configuration, data migration engine 116 is a software engine configured to receive and process input data from a user thereof pertaining to graphical user interface 140 from user interface 114 in order to migrate (i.e. promote) software code from a source database instance and target database instance.

Data migration engine 116 may be configured as a "virtual" administrative proxy configured as an adaptable and dynamic artificial intelligence capable of establishing an encrypted connection to the source database instance 120A and the target database instance 120B to allow for direct read/write access without permissions and perform a plurality of tasks such as validating whether all or some of the code cannot be migrated, coordinate backup of code being migrated, migrate the code, build a project resulting from the code migration in the target instance, determine if the code migration was successful, provide reporting, notification, etc.

Data migration engine 116 in other implementations may be configured as a data analysis tool for performing analysis functions associated with software code 122. Such analysis functions may include analyzing data structures, database tables, object information, and the like. For example, data migration 116 may be configured to receive and analyze software code 122 to determine user interface configurations, data processing instructions, data attributes, data hierarchy, nodes, nodal positions, values, summations, algorithms, source, security, hashes, and the like, associated with software code 122.

In one exemplar implementation, data migration engine 116 may be configured to provide communication via communication methods such as email, Short Message Service (SMS) (e.g., text messages), Multimedia Messaging Service (MMS), reports, charts, graphs, and the like. For example, data migration engine 116 may be configured to provide a software migration report in the form of an email, graphic display, etc.

Data migration engine 116 may receive source software code 122A from source database instance 120A for processing thereof. Such software code 122 may include and represent a composite of separate software code, listings, data objects, SQL scripts, pertaining to, for example, Human Resource Management Systems (HRMS), Financial Management Solutions (FMS), Supply Chain Management (SCM), Customer Relationship Management (CRM), Enterprise Performance Management (EPM) software, and the like.

Rendering engine 118 may be configured to receive configuration data pertaining to graphical user interface 140, associated software code 122, and other data associated with graphical user interface 140 such as user interface components, icons, user pointing device signals, and the like, used to render graphical user interface 140 on display 130. Rendering engine may also be configured to provide 2D and 3D visualizations to display 130, used to display, for example, graphical user interface 140.

Figure 2:
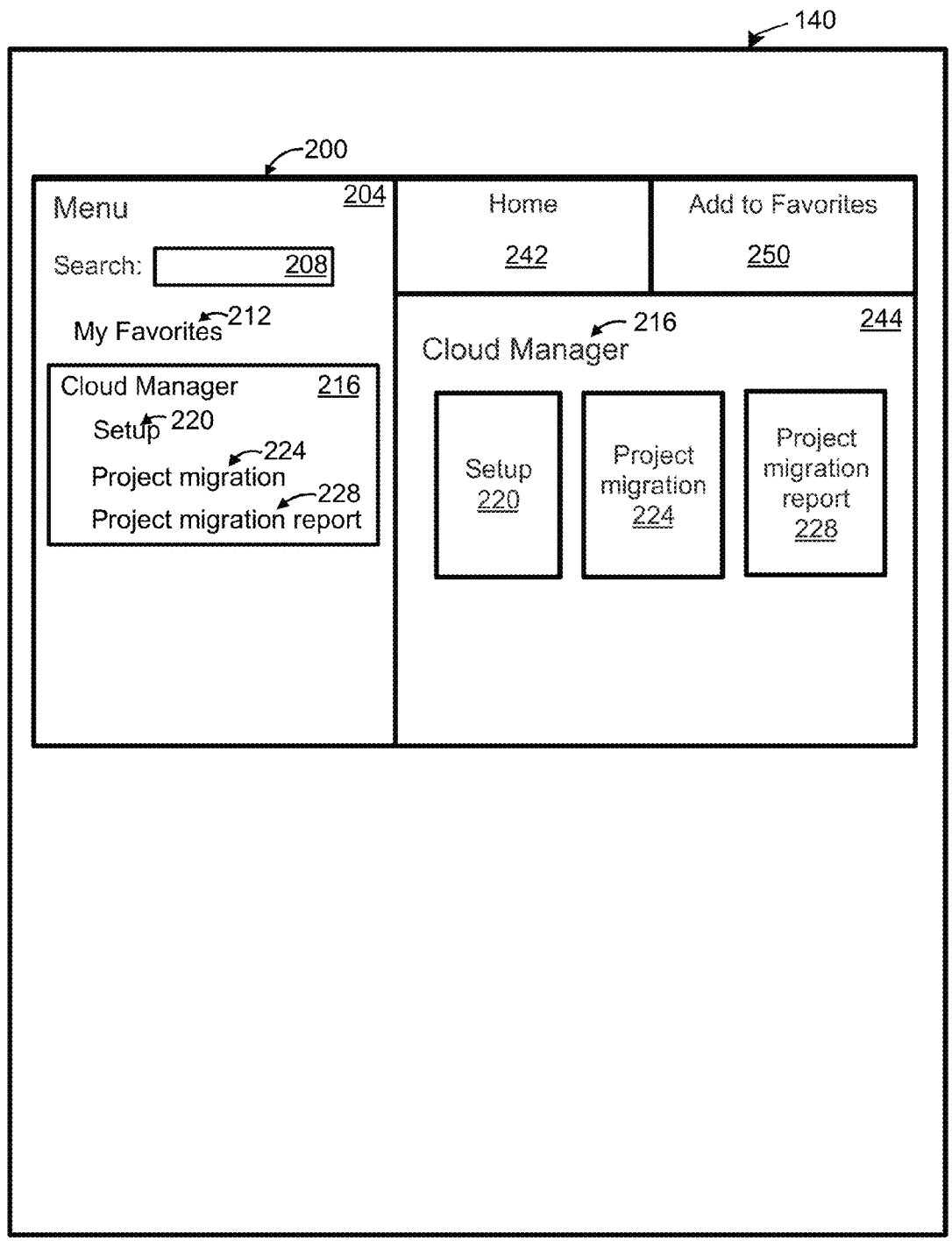
FIG. 2 is a high-level block diagram of an exemplary graphical user interface used for establishing and implementing a software code migration project.

FIG. 2 is a high-level block diagram of an exemplary graphical user interface 200 used for establishing and implementing a software code migration project. In one implementation, user interface 200 includes menu 204. Menu 204 includes "Search" function 208, to provide a search tool for user-initiated queries, "My Favorites" function 212, to allow a user to access a list of favorite functions, and "Cloud manager" function 216 described further herein.

Moreover, user interface 200 may also include other navigation functions such as "Home" 242, which when selected places a user at a "home page," e.g., cloud manager function 216, and "Add to favorites" function 250, used to add the current view to a list of favorites.

In one implementation, selecting one or more menu items expands the menu items into one or more sub-menus. For example, as illustrated, cloud manager 216 may be expanded to include setup menu 220, project migration menu 224, and project migration report submenus 228. In addition, user interface may include interface display 244 configured to provide access to such one or more selected menu items. For example, as illustrated in FIG. 2, cloud manager 216 is displayed both in menu 204 and in interface display 244.

In an implementation, cloud manager 216 may be configured to provide a user an interface for activating a number of functions, such as setting up one or more database instances, initiate code migration functions, generating reports, and the like. For example, as described further below, setup 220 allows a user to create and/or edit one or more database instances, project migration 224 provides user access to a process for migrating code from, for example, source database instance 120A to target database instance 120B, and project migration report submenus 228 to provide code migration reports to users thereof.

Figure 3:
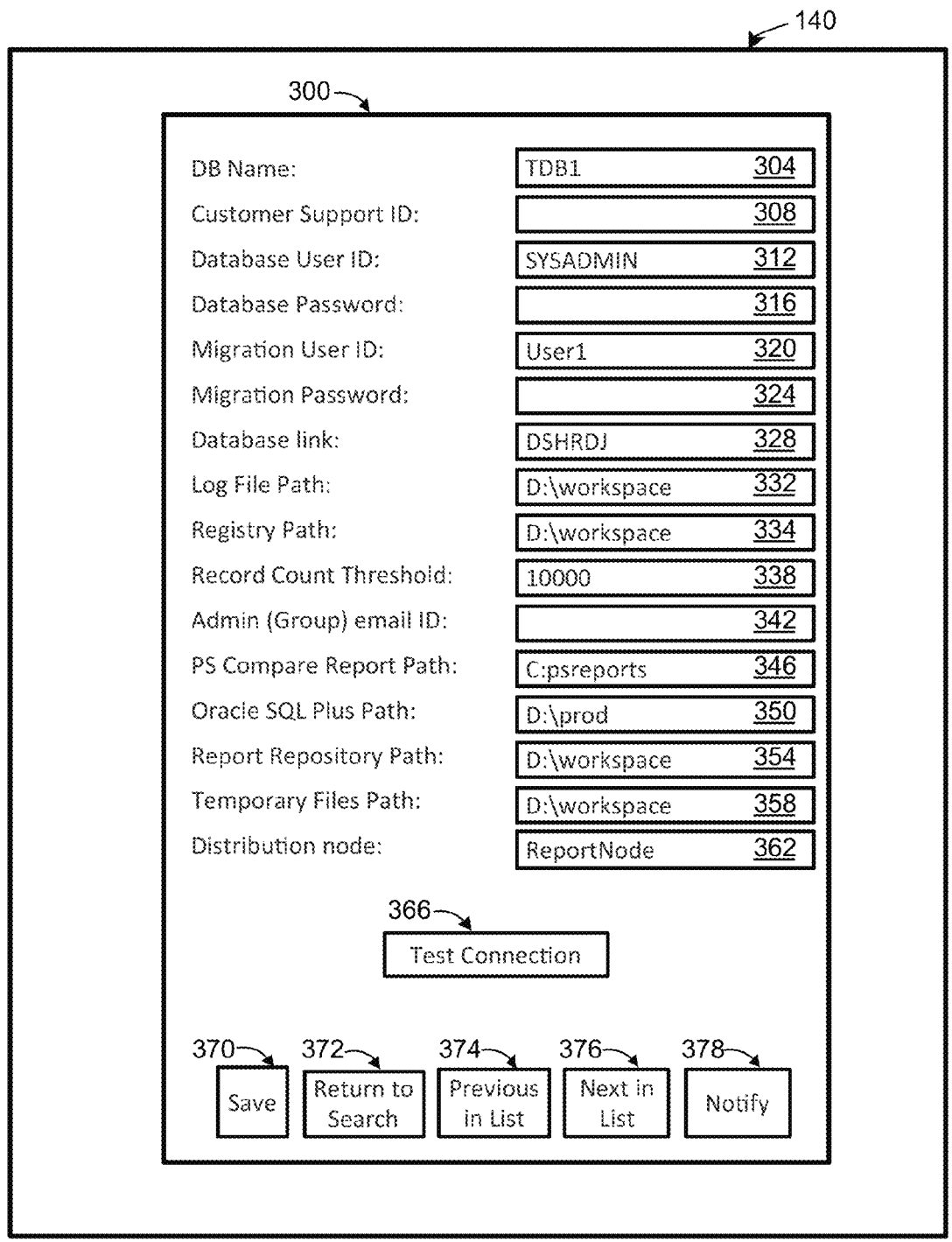
FIG. 3 is a high-level block diagram of an exemplary database interface used to establish and configure database instances for use with software code migration projects.

FIG. 3 is a high-level block diagram of an exemplary database interface 300 used for establishing and configuring a database instance for use with software code migration projects. In an exemplary implementation, database interface 300 includes fields (e.g., windows, etc.) to input, access, and display database (DB) name 304, used to name a database instance, customer support identification (ID) 308, used to identify a customer support reference, database user ID 312 and database password 316, to provide a username and password access to a database instance. For example, a user may utilize DB name 304 to establish target database instance 120B, named "TDB1," which is accessible by entering username "SYSADMIN," along with a password in database user ID 312 and database password 316 fields, respectively.

To establish a data migration path, database interface 300 may include fields for inputting, accessing, and displaying migration user ID 320 and migration password 316, database link 328, to provide a declared database connection path, for use in migrating code from a source database to a target database such as source database instance 120A target database instance 120B. For example, a user may use migration user ID 320 to declare a migration path username of "User1," which is connected by link name "DSHRDJ" entered as database link 328.

Database interface 300 may also include fields for entering data such as log file path 332, used to declare a location to store user log files, registry path 334, used to declare a data registry storage location, and record count threshold 338, used to set an upper threshold of size of table in the terms of number of rows in that table. Registry path 334 may be configured to set the file path to capture activities associated with the data migration project. For example, registry path field 334 may be configured to enter a path string such as "D:\workspace," for storing and accessing reports such as project comparisons, migration data, etc., as described further herein, in a database such as "D" having an instance name of "workspace."

In an exemplary implementation, record count threshold 338 may be configured to limit the impact on large tables in a target database instance, such as target database instance 120B. Such record count threshold field 338 may be configured with a default limit that may be changed, for example, by a user. For example, consider the case where to migrate source code located on source database instance 120A to target database instance 120B, requires altering a large table having more than ten thousand rows in the target database instance, if code migration project is impacting a table having more than fifteen thousand rows, an error flag may be sent or migration aborted as discussed further herein unless such ten thousand rows limit is set to a number higher than the fifteen thousand rows being impacted.

In some implementations, database interface 300 may fields for inputting and accessing admin (group) email ID 342, used to set an email distribution list, PS compare report path 346, used to set a path for comparison reports, ORALCE SQL PLUS path 350, used to set a path for SQL scripts, commands, etc., report repository path 354, used to establish a path for report storage, temporary files path 358, used to establish a path for temporary file location, and distribution node, used to establish a report distribution node. For example, as illustrated in FIG. 3, PS compare report path 346 includes an entry for a path "CApsreports," ORACLE SQL PLUS path 350 includes an entry for path "D: \prod," report repository path 354, temporary files path 358 includes an entry of "D: \workspace," and distribution node 362 includes a report distribution name of "Report-Node."

In an exemplary implementation, database interface 300 includes function such as "Test connection" 366, used to test a database connection, for example, by sending data between the source database instance 120A and target database instance 120B via database link defined in database link field 328, such as "DSHRDJ" as illustrated. In addition, database interface 300 may include functions such as "Save" 370, configured to save a state of database interface 300, "return to search" function 372, configured to transport a user operation from database interface 300 to a search query, "Previous in list" function 374, to access a database instance previously defined in a list of function before the instant database instance "TDB1," "next in list" function 376 to access a database instance listed after the current database instance, e.g., "TDB1," and "Notify" function 378 used to initiate communication, messages, etc., as described herein.

Figure 4:
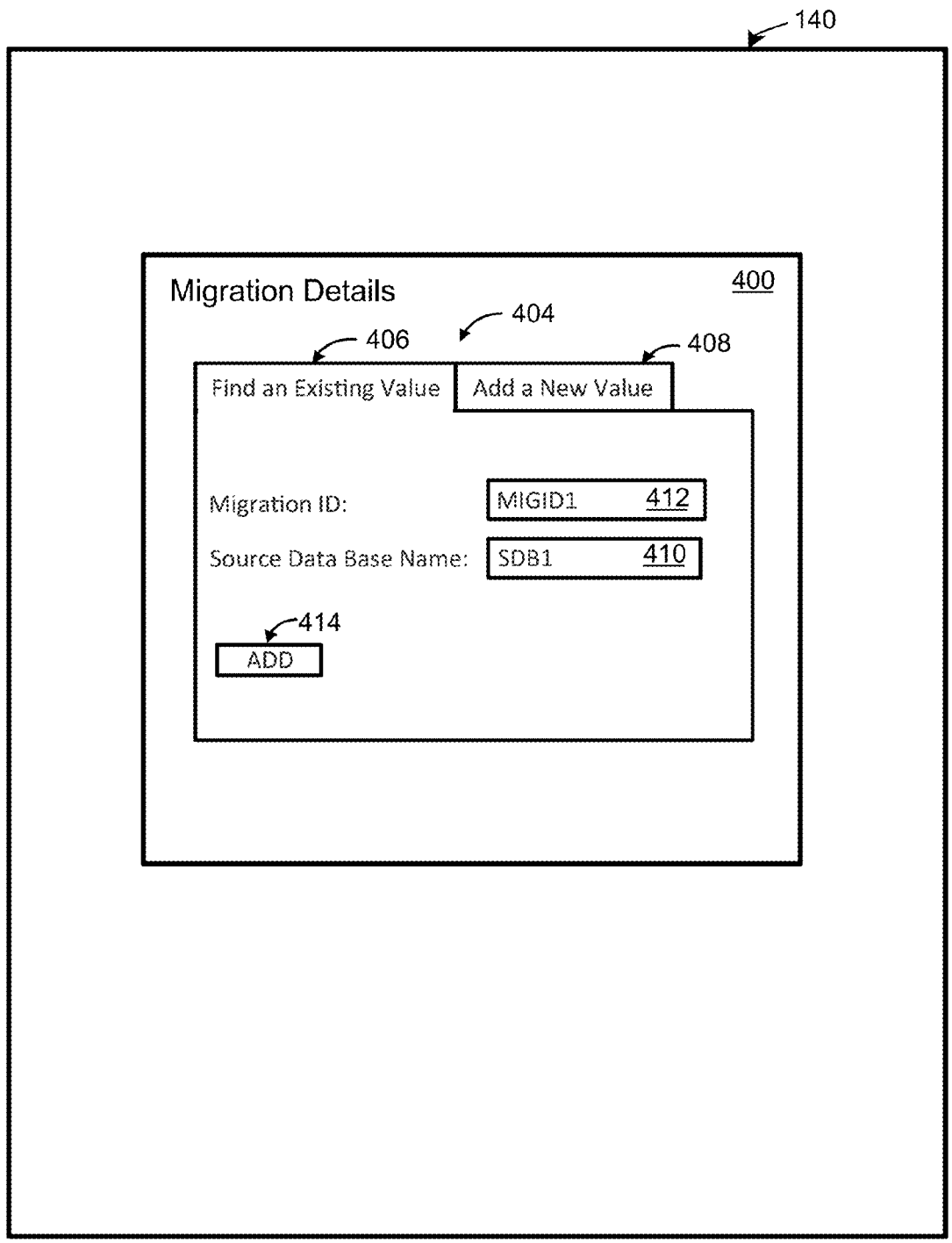
FIG. 4 is a high-level block diagram of an exemplary code migration interface used for establishing and configuring software code migration details use with a software code migration project.

FIG. 4 is a high-level block diagram of an exemplary migration details interface 400 used for establishing and configuring software code migration details for use with a software code migration project. Migration details interface 400 may be configured to facilitate a user with finding an existing source database and adding one or more target database instances. In an exemplary implementation migration details interface 400 includes migration interface 404, which includes existing value interface 406, and add new value interface 408 which may be created, for example, using database interface 300.

Interface 406 provides option to search existing migration request by providing unique migration identifier (ID) 412. Interface 408 provides option to enter source database name 410 and call "Add" function 414. In one implementation, a unique migration identifier 412 is automatically generated when a migration request is saved by executing "Save" function, such as save function 580 described below. For example, as illustrated, a migration ID 412 of "MIGID1" is automatically generated upon invoking save function 580.

Figure 5A:
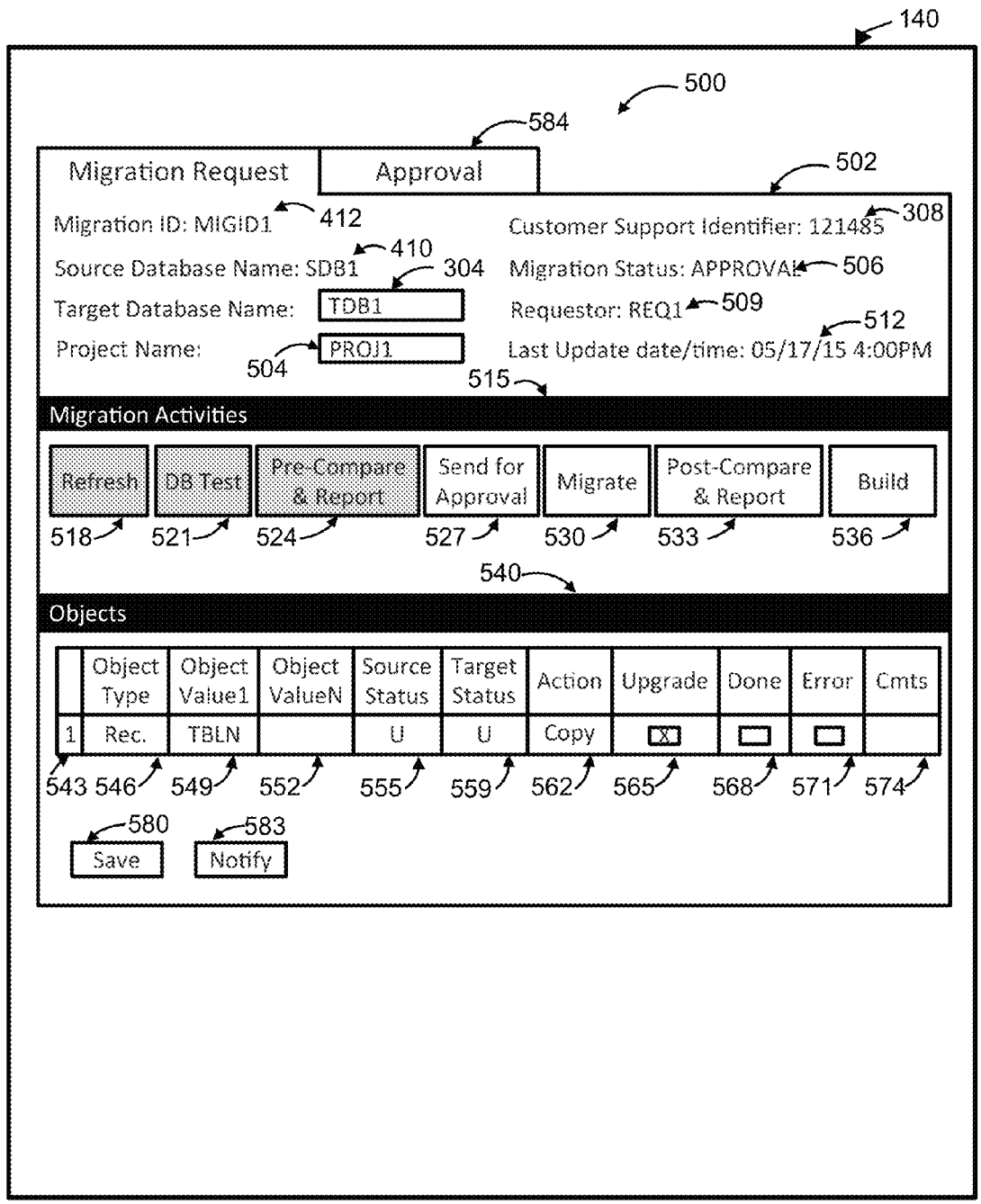
FIG. 5A is a high-level block diagram of an exemplary code migration interface in a first state of a software code migration project in process.

FIGS. 5A-E are a high-level block diagrams of an exemplary code migration interface 500 used for migrating software code from source database instances to target database instances, in various states of operation as described herein. FIG. 5A is a high-level block diagram of code migration interface 500 in a first state where source software code such as software code 122A is in a first stage of migration from source database instance 120A to target database instance 120B.

In one exemplary implementation, code migration interface 500 includes migration request interface 502 configured to facilitate a code migration project and approval interface 584. In some implementations, approval interface 584 may be configured to receive input to accept or reject code migration via for example, user interface 114.

Migration request interface 502 includes information pertaining to migrating software code from a source database instance to a target database instance. Such information may include migration ID 412, which is a unique migration identifier (ID), source database name 410, used to specify a source database instance, target database name 304, used to specify a target database instance, and project name 504, used to assign a project name to the code migration process.

Migration request interface 502 may also include information such as customer support identifier 308, used to assign an optional customer service code, migration status 506, for determining the status of a code migration project, requestor 509, and the last update date and time 512, to provide information pertaining to an instance of date and time when one or more updates to the code migration project occurred.

Migration request interface 502 includes migration activities interface 515, configured to facilitate a user in performing software code migration from one or more source database instances to one or more target database instances, and an object interface 540, described further below. In addition, migration request interface 502 may include save function 580, used to save a current state of migration request interface, and a notify function 583, used to invoke a communication function such as a display notification, SMS text message, email notification, and the like.

In one exemplary implementation, migration activities interface 515 includes refresh function 518, database test (DB test) function 521, and pre-compare and report function 524 discussed further herein. Refresh function 518 may be used to refresh the migration request interface 502. Database test function 521 provides a user with a functional test of a database connection to, for example, source database instance 120A and target database instance 120B. Such functional test may be used for example, to determine whether an encrypted connection, such as database link 328, has been established to source database instance 120A and target database instance 120B.

Objects interface 540 indicates the state of objects associated with the software code being migrated. As illustrated in FIG. 5A, objects interface 540 may include fields pertaining to a one or more database objects. In one implementation, objects interface 540 includes an object count indicator 543, object type indicator 546, object value1 indicator 549, for parent object, and object valueN indicator 552, for an "nth" level child object, source database instance status indictor 555, and target database instance status 559. Objects interface 540 may also include upgrade checkbox indicator 565, to determine whether to upgrade the target database instance 120B, done checkbox 568, to enable communication that the code migration process has ended, an error checkbox indicator 571 indicating whether the migration has been unsuccessful for that object, and comments field 574, to provide an interface for comment input and/or display.

In a first state prior to operating pre-compare and report function 524, objects interface 540 may include default values and other pertinent information pertaining to database objects associated with a code migration project. For example as illustrated in FIG. 5A, objects interface 540 includes an object count of "1" displayed in count indicator 543, "Rec. indicating a "Record" displayed in object type indicator 546. Object value1 named "TBLN", object valueN indicator 552 is "blank," indicating that object 1 is parent object in this illustration, source database status indicator 555 and target database instance status indicator 559 indicates "U" for "Unknown Status." Action function 562 is set to "Copy" indicating that the source code being migrated will be copied from the source database instance 120A.

Referring to FIGS. 1 and 5A, Prior to software code migration, pre-compare and report function 524 may be configured to perform a comparison of source database instance 120A to target database instance 120B using, for example, data migration engine 116. In one implementation, pre-compare and report function 524 compares information pertaining to the data objects associated with migrating the software code from the source database instance 120A to target database instance 120B. Such data object migration information may include metadata, file size, type of object, encryption state, and the like. For example, pre-compare and report function 524 may process and compare metadata descriptions pertaining to objects associated with source database instance 120A with objects associated with target database instance 120B to determine whether they are any acceptable and unacceptable differences in the type of objects, such as tables, indexes, stored procedures, sequences, views, synonyms, etc., as well as acceptable and unacceptable differences in other object information such as attributes, size, color, function, structure, and the like.

Figure 5B:
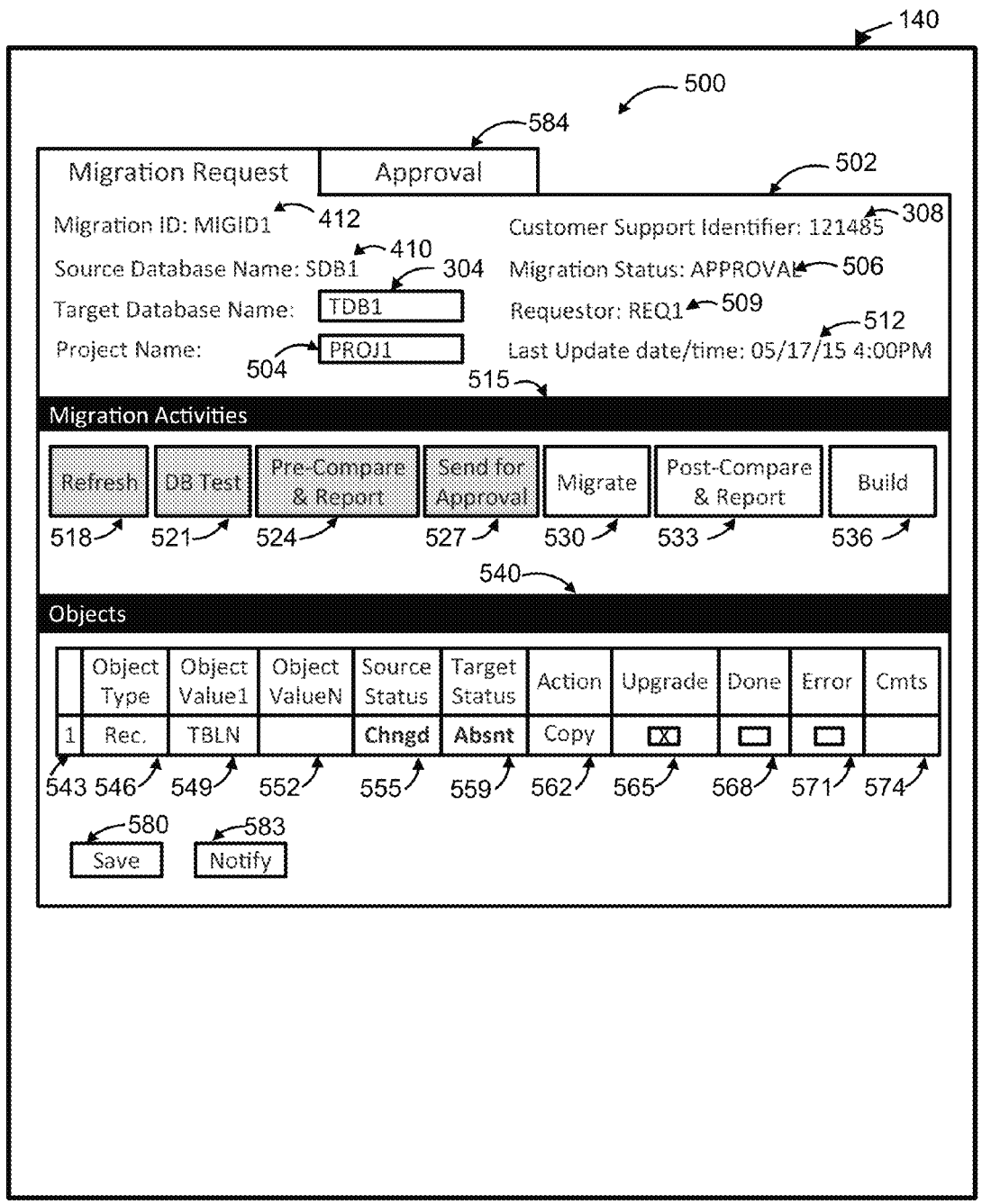
FIG. 5B is a high-level block diagram of an exemplary code migration interface in a second state of a software code migration project in process.

FIG. 5B is a high-level block diagram of code migration interface 500 in a second state of a code migration project in process. In one implementation, if pre-compare and report function 524 determines from analysis of data migration information pertaining to data objects associated with the code migration project that there are no differences between data objects associated with source database instance 120A and objects associated with target database instance 120B, or the differences are within values acceptable to pre-defined validation rules, a send for approval function 527 is invoked, for example, by data migration engine 116. Send for approval function 527 provides an optional non-database object related user migration validation check. For example, when invoked approval function 527 may either allow or prohibit a user from continuing to migrate the code from source database instance 120A to target database instance 120B based on business decisions such as management approvals, project changes, and the like.

In other implementations, if pre-compare and report function 524 determines that there are differences between objects associated with source database instance 120A and objects associated with target database instance 120B that would prevent an acceptable code migration to occur, or the differences are not within values acceptable to pre-defined validation rules, a send for approval function 527 is not invoked and an error flag is set, for example, by data migration engine 116. For example, given the differences between the objects between source database instance 120A and target database instance 120B include differences in the number of tables where migrating the software code would result in the loss of data (e.g., data deletion) in the target database instance 120B, pre-compare and report function 524 may be configured to stop some or all of the code migration project and report an error, for example, by sending an email notification to one or more personnel.

As pre-compare and report function 524 may be configured to determine whether to allow for approval from a third-party, send for approval function 527 may be configured to provide a third-party, such as management, with validation information pertaining to the code migration project in order to provide the third part the opportunity to cancel or approve the code migration project. Since pre-compare function 524 has validated the migration project such that some or all of the software code may be safely migrated, a third party is free to inhibit or allow such code migration based on other factors outside data preservation, such as business decisions, management approval procedures, changes in project scope, etc.

Figure 5C:
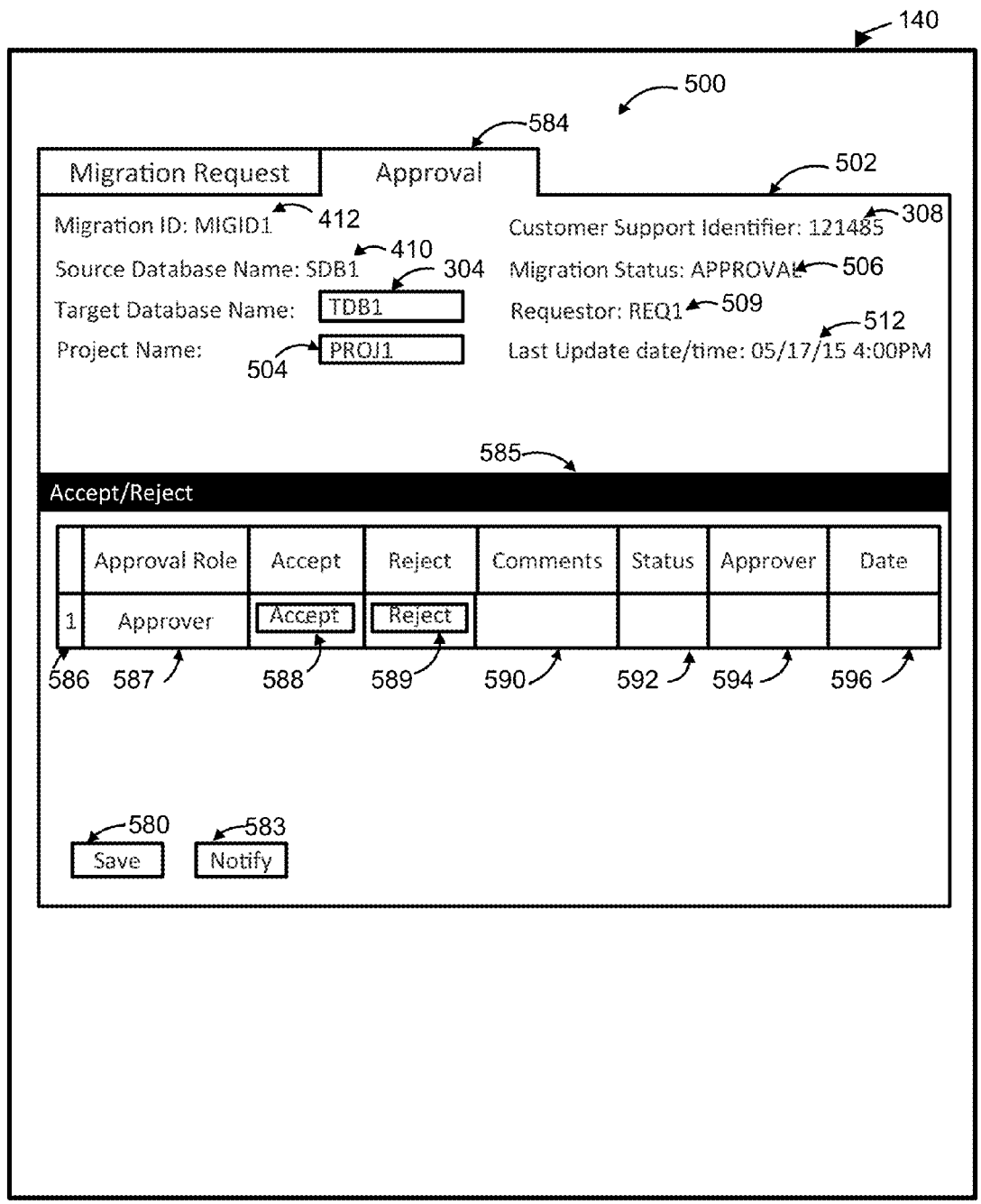
FIG. 5C is a high-level block diagram of an exemplary code migration interface in a third state of a software code migration project in process.

FIG. 5C is a high-level block diagram of code migration interface 500 in a third state of a code migration project in process awaiting approval. In an exemplary implementation, approval may be received via approval interface 584. Approval interface 584 may include data pertinent to the code migration project such as migration ID 412, source database name 410, target database name 304, project name 501, customer support identifier 308, migration status 506, requestor 509, and last date/time update indicator 512 as discussed herein. To provide an additional process check, approval interface 584 may be configured to only be accessible to those third parties or personnel having permission to access approval interface 584.

In one implementation, approval interface includes an "Accept or Reject" interface 585 used to display information pertaining to one or more current migration projects and receive an approval input from a third party, for example, through user interface 114. Accept or reject interface 585 may include project count indicator 586, used to indicate a count number for each project displayed, approval role 587, used to indicate the role of the third-party approver, such as a project manager, to the approval information, accept function 588, and reject function 589 used to provide approval acceptance or approval rejection signals to for example, data migration engine 116. Accept or reject interface may also include comment fields 590, to provide an input interface for adding comments, for example, on reasons for accepting or rejecting a code migration project, status indicator, used to indicate the status of the migration approval, approver indicator 594, providing the name or insignia of the third-party approver, and date field 596, to provide data pertaining to date and/or time of approval or rejection.

Figure 5D:
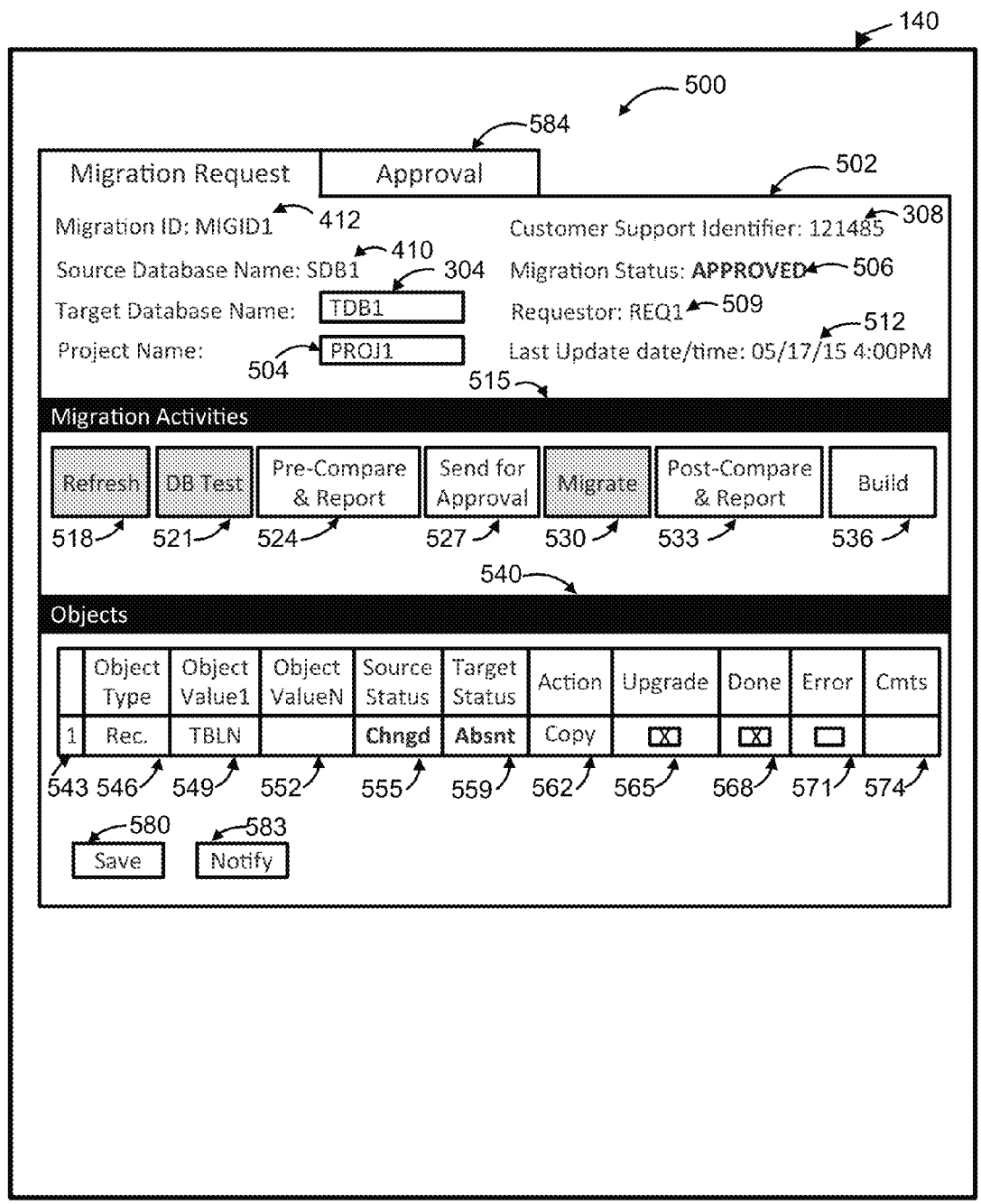
FIG. 5D is a high-level block diagram of an exemplary code migration interface in a fourth state of a software code migration project in process.

FIG. 5D is a high-level block diagram of code migration interface 500 in a fourth state where a code migration project is in process. If required, upon receipt of migration approval from approval interface 584, migration activities interface 515 activates code migrate function 530, for example, through interaction with data migration engine 116. If such approval step is not required, migration activities interface 515 activates code migrate function 530 upon completion of pre-compare and report function 524. Upon activation of code migrate function 530, to perform a software code migration from, for example, source database instance 120A to target database instance 120B, a code migration process may be invoked by a user selection of code migrate function 530.

At this juncture in the code migration process, upon the migration of software code from source database instance 120A to target database instance 120B, objects interface 540 may be changed to reflect the migration project is complete. For example, as illustrated in FIG. 5D, the status indicator of the done checkbox 568 is changed from an "unchecked" state to a "checked" state. Checkbox 568 provides an active display of the status of the code migration in order to inform a user, for example, that such code migration is complete. If at this stage either errors did occur in the migration process, or such errors were outside an error threshold as discussed herein, code migrate function 530 may set an error flag and notify the user, for example through a display notification, SMS text message, email notification, and the like. For example, error checkbox 571 may be changed from an unchecked state to a checked state to indicate that an error has occurred in the code migration process.

Figure 5E:
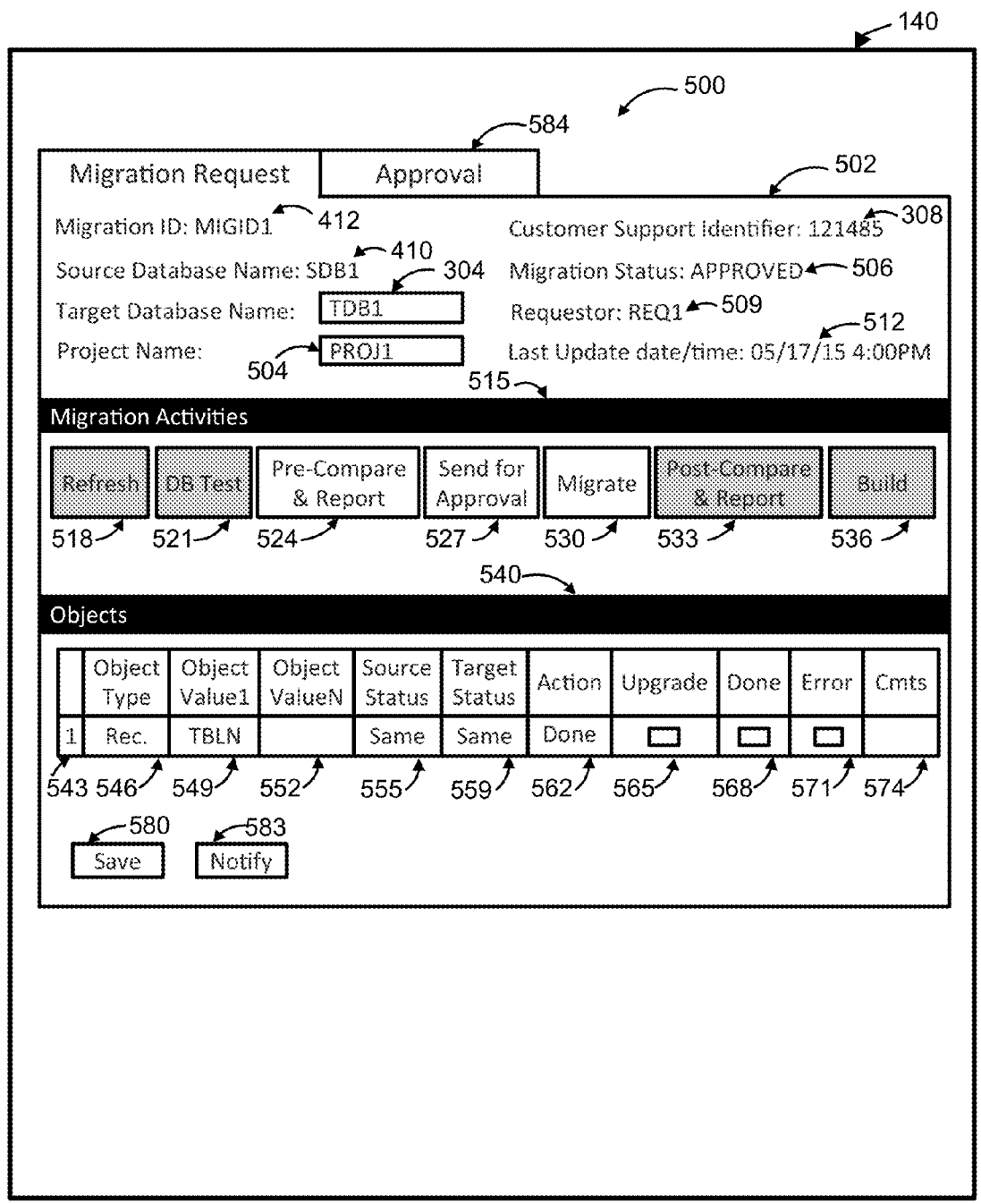
FIG. 5E is a high-level block diagram of an exemplary code migration interface in a fifth state of a software code migration project in process.

FIG. 5E is a high-level block diagram of code migration interface 500 in a fifth state of a code migration project in process. Upon completion of the migration process, a post-compare and report function 533 may be invoked by a user through, for example, migration engine 116, to determine whether the code migration process was successful. For example, as illustrated in FIG. 5E, a post-compare and report function 533 may be invoked using data migration engine 116, for example, to determine differences between objects associated with source database instance 120A and objects associated with target database instance 120B, or the differences are within values acceptable to pre-defined post migration validation rules.

Upon successful completion of such post-comparison, post-compare and report function 533 may set a migration successful flag and notify the user, for example through a display notification, SMS text message, email notification, and the like. For example, upon successful completion of a code migration, through data migration engine 116, post-compare and report function 533 may set the source status indicator 555 and the target status indicator 559 to "Same," indicative of a successful code migration.

After successful code migration of all or a portion of software code 122 to target database instance 120B, build function 536 may be invoked, for example, through the use of data migration engine 116, to build the software application in target database instance 120. Depending on whether target database instance 120B includes an existing application associated with the migration project, such build function 536 may serve to update an existing software application being updated through the software code migration process, or build a new software application from the migrated software code.

Thus, as discussed herein, code migration interface 500 provides a platform for safely migrating software code between a source database instance 120A and a target database instance 120B without the need for user read/write permissions, and may be configured to safely migrate some or all software code depending on pre and post comparisons of the database objects associated with the software code migration project. Advantageously, pre-compare and report function 524 and post-compare and report function 533 provide a flexible and dynamic data comparison scheme. For example, pre-compare and report function 524 and post-compare and report function 533 may perform substantially the same comparison to ensure that the objects associated with both the source database instance 120A and target database instance 120B are substantially the same, or within a predefined range of acceptance.

Alternatively, pre-compare and report function 524 and post-compare and report function 533 may be configured to compare objects using different sets of validation rules. For example, pre-compare and report function 524 and post-compare and report function 533 may use different sets of validation rules to determine whether to allow database changes to target database instance 120B, determine which portion of software code to migrate, control software code migration based on business decision inputs, and the like.

Figure 6:
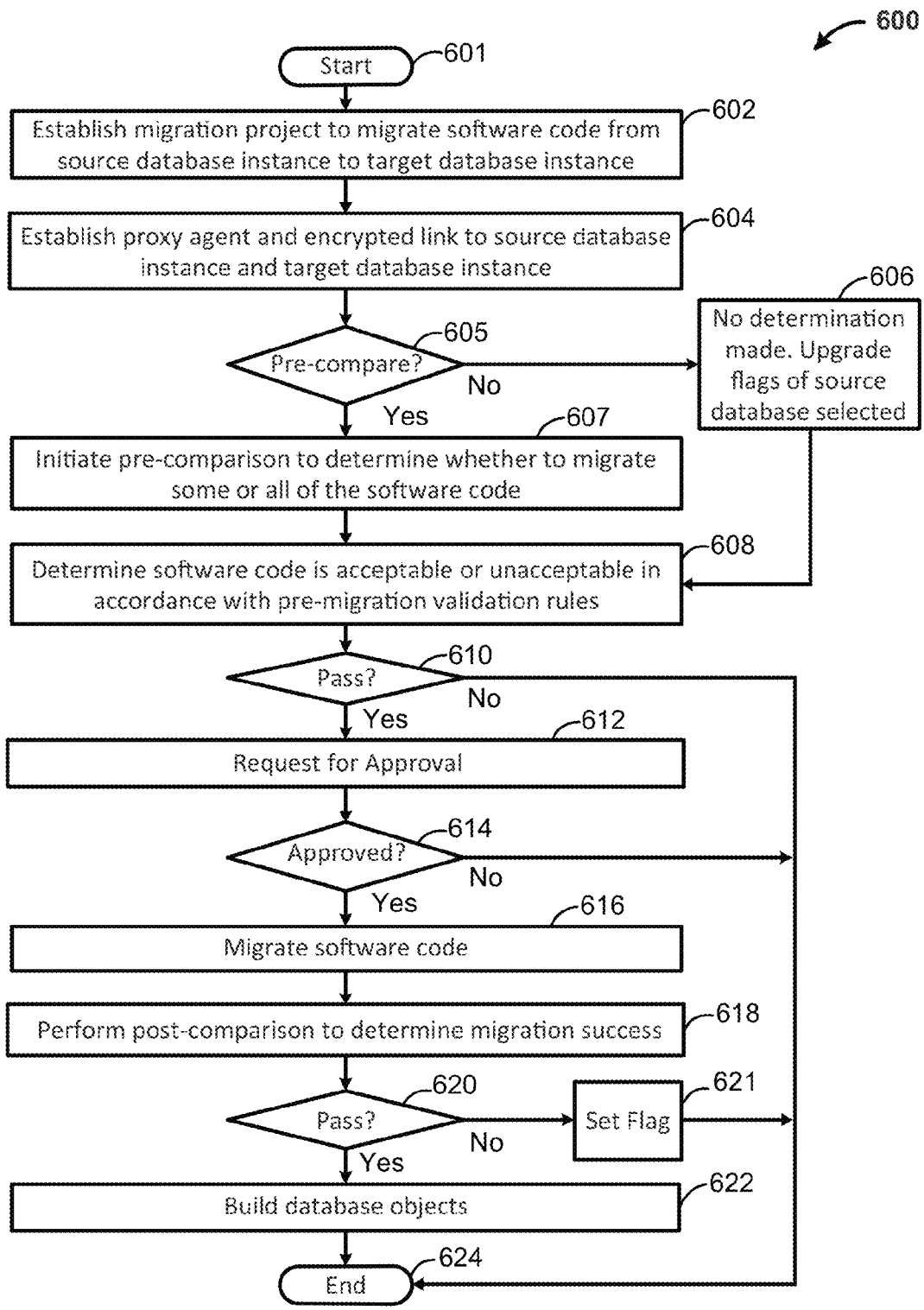
FIG. 6 is a flow diagram of an example method adapted for use with implementations, and variations thereof, illustrated in FIGS. 1-5.

FIG. 6 is a flow diagram of an example method 600 adapted for use with implementations, and variations thereof, illustrated in FIGS. 1-5. Method 600 may be entered into at step 601, for example, by a user invoking data migration engine 116 through migration request interface 502. At 602, method 600 establishes a software code migration project to migrate (i.e., promote) software code from a source database instance to a target database instance. For example, referring to FIGS. 1, and 5A-5E, a user may invoke data migration engine 116 via interaction with migration request interface 500 to identify and access the software code to be migrated, source database instance 120A, target database instance 120B, create a project name 504, identify requestor 509, etc., as described herein.

At 604, method 600 establishes a proxy agent used to establish an encrypted link to a source database instance and target database instance. For example, as illustrated in FIGS. 1 through 5A-5E, a user may invoke data migration engine 116 as a proxy agent to establish an encrypted database link 328 to source database instance 120A and target database instance 120B.

At 605, method 600 determines whether a pre-comparison process is necessary. If such pre-comparison process is not necessary, method 600 proceeds to 606 to set flags of the source database selected, and then proceeds to 608 described below. Such flags may be set to indicate that a pre-comparison process of comparing information pertaining to database objects associated with the source and target database objects is not necessary. However, if a pre-comparison process is requested, then method 600 proceeds to 607 to initiate a pre-comparison process. For example, as illustrated in FIGS. 1 and 5A, a user may utilize migration request interface 502 to initiate a pre-comparison process by selecting pre-compare and report function 524.

At 607, method 600 initiates and performs a pre-comparison process on information pertaining source database objects and target database objects associated with the code migration project to determine whether to migrate some or all of the software code associated with a software code migration project. For example, as illustrated in FIGS. 1 and 5A, a user may utilize migration request interface 502 to select pre-compare and report function 524 to invoke data migration engine 116 to perform a comparison of information pertaining to database objects associated with a software code migration project to determine acceptable and unacceptable differences in the data objects, which may be used by method 600 to allow or disallow the migration of some or all of the software code proposed for migration as described herein.

Upon completion of the pre-comparison at 607, in one implementation at 608, method 600 may be configured to use pre-comparison validation rules to analyze whether migrating the software code from the source database instance to the target database instance would result in acceptable or unacceptable loss of data in the target database instance where a loss of data refers to data deletion or data disassociation, such as the deletion of a column and associated data in a database table.

Such pre-comparison validation rules may also be used to determine whether to migrate some or all of the software code based on other types of information such as business decisions, approvals, etc., and allow or deny non-destructive database changes, such as changing the font type of an application display, color schemes, layouts, user interface element schemes, etc.

Upon completion of the pre-comparison analysis at 608, at 610, method 600 determines whether to migrate all, some, or none of the software code by analyzing results from 607 and/or 608. In one implementation, if no unacceptable errors were found, or the unacceptable errors are within an acceptance threshold (e.g., pass), method 600 proceeds to 612. However, if at least one unacceptable error is found or the unacceptable errors exceed the acceptance threshold, at 608, method 600 proceeds to 624 and ends.

At 612, optionally, a request for approval may be sent to a third-party for approval of the software code migration. For example, as illustrated in FIGS. 1 and 5B, a user may select send for approval function 527 to invoke data migration engine 116 to issue a request for approval to third parties, such as project managers, supervisors, customers, and the like.

At 614, in response to receiving approval, pass, or a signal indicative of not requiring approval, method 600 proceeds to 616. At 616, method 600 performs the migration of the software code associated with the migration project from the source database instance to the target database instance. For example, as illustrated in FIGS. 1 and 5D, migration may be initiated by a user selecting code migrate function 530, invoking data migration engine 116 to migrate software code from source database instance 120A to target database instance 120B.

At 618, method 600 performs a post-comparison migration validation process on information pertaining to the source database objects and the target database objects to determine whether any acceptable or unacceptable errors occurred as a result of the software code migration. For example, as illustrated in FIGS. 1 and 5E, a user may select post-compare and report function 533 by invoking data migration engine 116 to perform a comparison of the database objects associated with the software code migration project.

In one implementation at 618, method 600 may be configured to use post-comparison migration validation rules to analyze whether migrating the software code from the source database instance to the target database instance resulted in an acceptable or unacceptable loss of data in the target database instance, where a loss of data refers to data deletion or data disassociation, such as the deletion of a column and associated data in a database table.

Such post-comparison migration validation process may use such validation rules to determine whether the software code migration resulted in the occurrence of non-data object related errors by analyzing other types of information such as business decisions, approvals, etc., or validating the approval of non-destructive database changes, such as changing the font type of an application display, color schemes, layouts, user interface element schemes, etc.

Upon completion of the post-comparison migration validation process at 618, at 620, method 600 determines whether the software code migration was successful by analyzing results from 618. In one implementation, if no unacceptable errors were found, or the unacceptable errors are within an acceptance threshold, method 600 proceeds to 622. However, if at least one unacceptable error is found, or the unacceptable errors exceed the acceptance threshold, at 620, method 600 proceeds to 621 to set an error flag and ends at 624.

At 622, method 600 builds the application on the target database instance. For example, as illustrated in FIGS. 1 and 5D, a user may select build function 536 by invoking data migration engine 116 to perform a software build using the migrated software code disposed on target database instance 120B associated with the software code migration project. Upon completion of the software build at 622, method 600 ends at 624.

Figure 7:
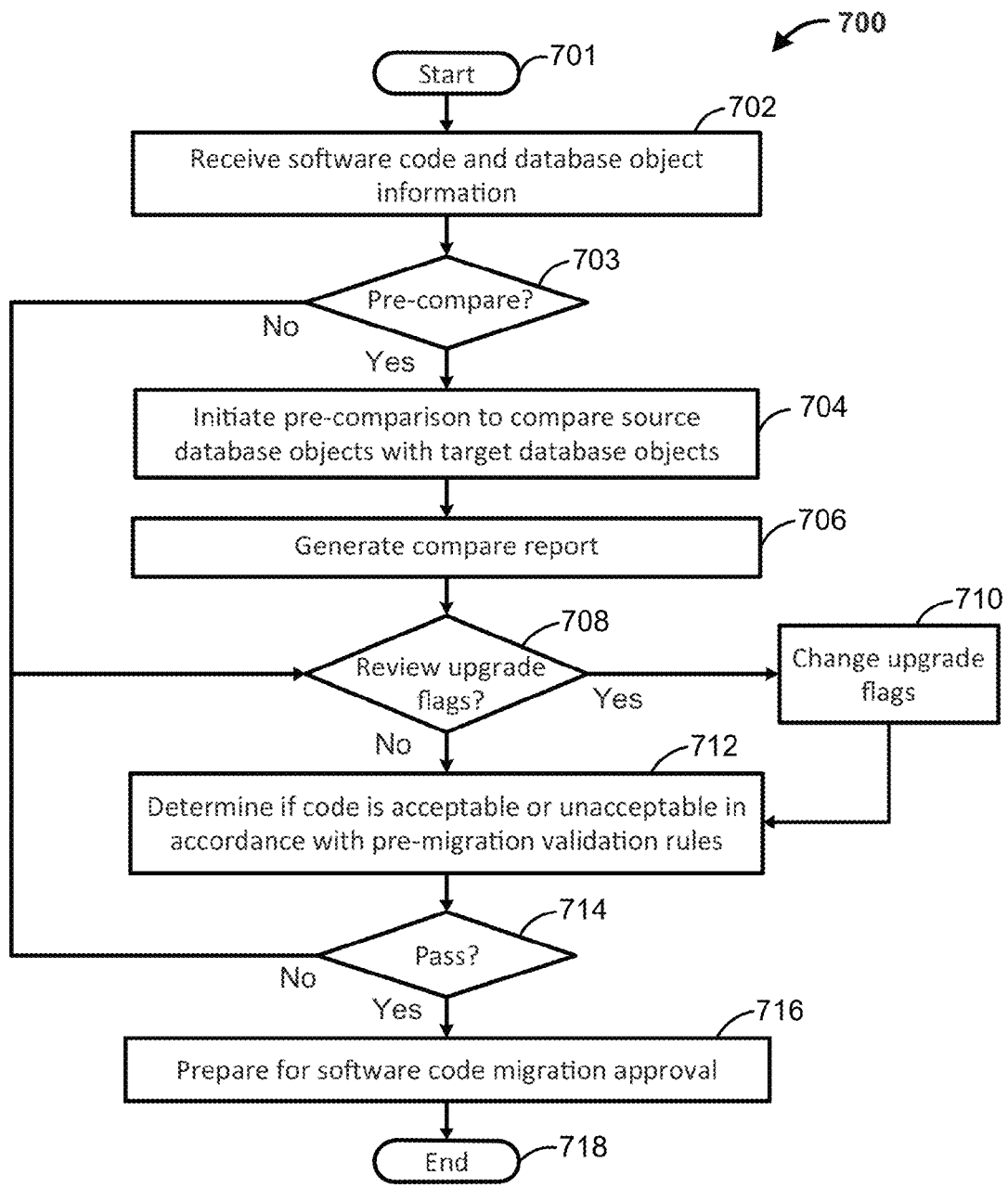
FIG. 7 is a flow diagram of an example method adapted for use with implementations, and variations thereof, illustrated in FIGS. 1-6.

FIG. 7 is a flow diagram of an example method 700 adapted for use with implementations, and variations thereof, illustrated in FIGS. 1-6, for determining whether to proceed with a software code migration from a source database instance to a target database instance. Method 700 may be entered into at 701, for example, by a user invoking data migration engine 116 via selection of pre-compare and report function 524.

At 702 software code for migration and associated database object information pertaining to both a source database instance and target database instance is received for processing. Such database object information includes virtually any information pertaining to the database objects such as metadata and other data describing the database objects such as object type, object schema, encryption values, size, version, etc. For example, as illustrated in FIGS. 1, 5A-5E, a user may invoke data migration engine 116 to receive and process software code for migration and associated database object information pertaining to both source database instance 120A and target database instance 120B.

At 703, method 700 checks whether an object pre-comparison process, such as, for example, a pre-comparison process using data migration engine 116, has been initiated. If the object pre-comparison process has been initiated, method 700 proceeds to 704. If the object pre-comparison process has not been initiated, method 700 proceeds to 708 described below.

At 704, method 700 performs an object pre-comparison process. The object pre-compare process may be used to compare information pertaining to source database objects and target database objects. In some implementations, the object pre-compare processes analyzes data embedded with and/or associated with the database objects such as attributes, hash values, metadata, code, scripts, checksums, or other data associated with source database objects to target database objects. For example, as illustrated in FIGS. 1, 2, and 5A-5E, a user may utilize migration request interface 502 to invoke data migration engine 116 to perform a pre-comparison of information pertaining to database objects associated with a software code migration project.

Upon completion of 704, at 706, method 700 generates a pre-compare report used to provide users with data pertaining to the pre-compare process described herein. Such report may contain information pertaining to the data objects, differences between corresponding data objects, and other data that may be used to determine unacceptable data loss, acceptable data loss, unacceptable non-data values, and acceptable non-data values. For example, as illustrated in FIGS. 1, 2, and 5A-5E, pre-migration comparison and reporting may be initiated by a user selecting pre-compare and report function 524, invoking data migration engine 116 to prepare one or more software code pre-migration comparison reports, that may be accessed, as an example, using project migration report submenus 228

Such pre-compare reports may include information pertaining to information that may be used to determine acceptable and unacceptable destructive changes to database table rows and columns, changes to values within a database table, changes to access permissions, and the like, that may result in acceptable or unacceptable data loss which includes, as an example, overwriting, deleting, or disassociation of data values associated with one or more database tables.

In addition, such pre-compare report may further include information that may be used to determine other acceptable and unacceptable non-data factors related to whether the software code migration will be successful or unsuccessful including unacceptable or acceptable changes to database table naming conventions, types of software code allowed, version control, encryption types allowed, data transmission processes, passwords, usernames, etc., and may include other types of information such as whether migration approvals from third parties and other personnel associated with approving a software code migration process were received.

At 708, method 700 determines whether to review upgrade flags. If not, method 700 proceeds to 712 described below. If so, method 700 proceeds to 710 to set or change one or more upgrade flags, and then proceeds to 712. For example, as illustrated in FIGS. 1, 5D, and 5E, a user may utilize migration request interface 502 to invoke data migration engine 116 to check or uncheck upgrade checkbox indicator 565 to indicate that the software is being upgraded.

At 712, method 700 determines based on the pre-comparison data whether to allow all, some, or none of the software code to be migrated from the source database instance to the target database instance in accordance with one or more of the pre-migration validation rules. In one implementation, at 712, method 700 performs a pre-comparison process whereby information associated with source database objects and target database objects are compared in accordance with the pre-migration validation rules to determine acceptable and unacceptable database changes, and acceptable and unacceptable non-data factors that would occur upon software code migration.

In an exemplary implementation, pre-migration validation rules include rules pertaining to unacceptable data loss, acceptable data loss, unacceptable non-data values, and acceptable non-data values. For example, pre-migration validation rules may include rules pertaining to acceptable and unacceptable destructive changes to database table rows and columns, changes to values within a database table, changes to access permissions, and the like, that may result in acceptable or unacceptable data loss which includes, for example, overwriting, deleting, or disassociation of data values associated with one or more database tables.

Such pre-migration validation rules may further include rules pertaining to other acceptable and unacceptable non-data factors related to whether to allow software code migration, such as unacceptable or acceptable changes to database table naming conventions, types of software code allowed, version control, encryption types allowed, data transmission processes, passwords, usernames, etc., and may include other types of rules such as migration approval rules for use by third parties and other personnel associated with approving a software code migration process.

Upon completion of the pre-comparison process at 712, at 714, method 700 determines whether to migrate the software code by analyzing results from 712 to determine whether any unacceptable data destruction or acceptable non-data values would occur upon software code migration. In one implementation, if no unacceptable data loss or unacceptable non-data values would occur, or the data loss is acceptable, or in an acceptable range, upon software code migration, method 700 proceeds to 716. However, if at least one unacceptable data loss would occur or unacceptable non-data values would occur outside an acceptance range, at 714, method 700 proceeds to 708, and if a flag is required, method 700 proceeds from 708 to 710 to set one or more flags.

At 716, method 700 prepares the software code for migration associated with the migration project between the source database instance and the target database instance and then ends at 718. For example, as illustrated in FIGS. 1 and 5D, migration may be initiated by a user selecting send for approval function 527, invoking data migration engine 116 to prepare to migrate software code from source database instance 120A to target database instance 120B upon receiving an approval signal.

Figure 8:
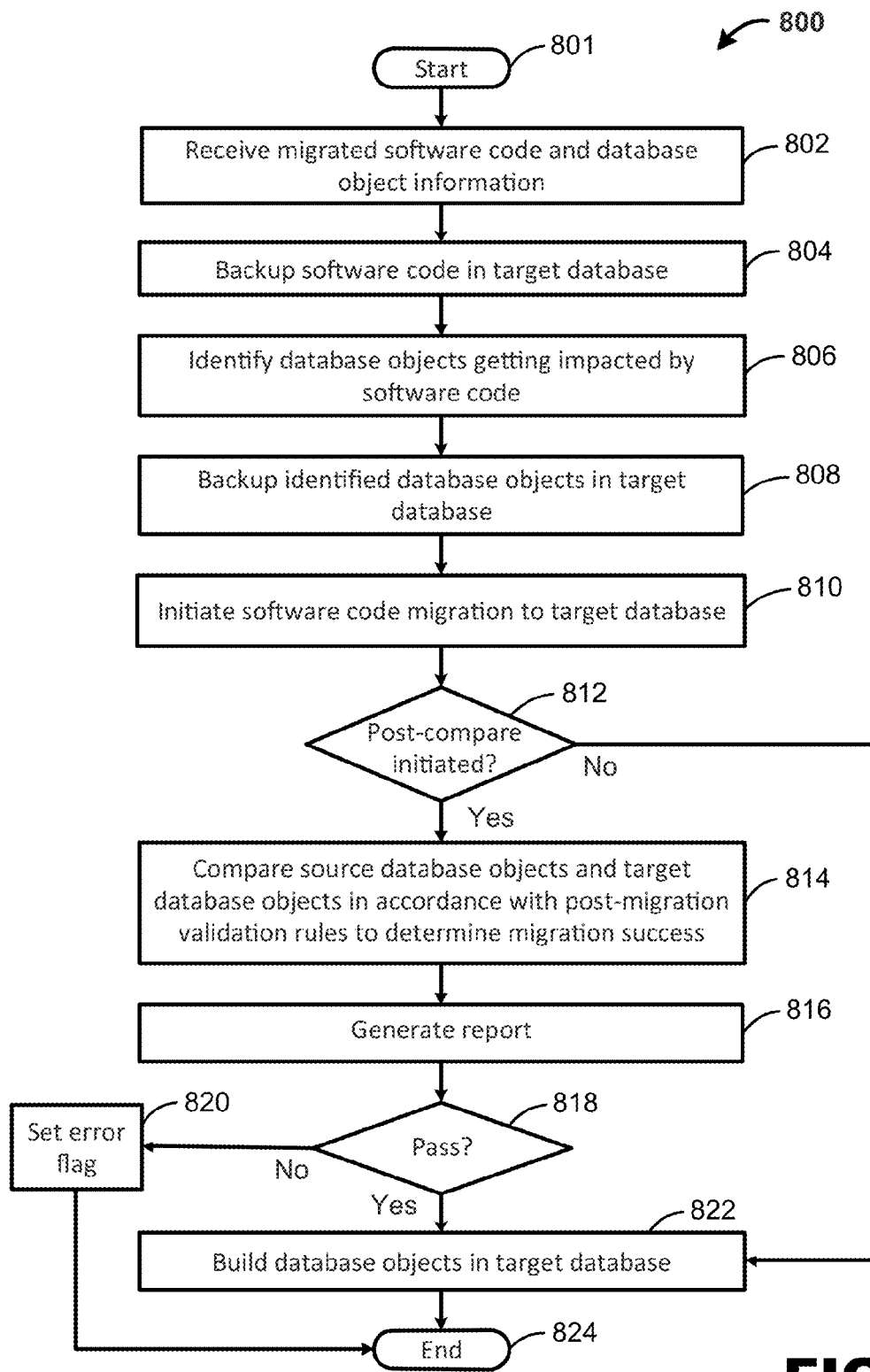
FIG. 8 is a flow diagram of an example method adapted for use with implementations, and variations thereof, illustrated in FIGS. 1-7.

FIG. 8 is a flow diagram of an example method 800 adapted for use with implementations, and variations thereof, illustrated in FIGS. 1-7, for determining software code migration from a source database instance to a target database instance was successful. Method 800 may be entered into at 801, for example, by a user invoking data migration engine 116 through selecting migrate function 530.

At 802, associated database object information associated with data objects pertaining to a source database instance and a target database instance is received for processing. Such database object information includes virtually any information pertaining to the database objects such as metadata and other data describing the database objects such as object type, object schema, encryption values, size, version, etc. For example, as illustrated in FIGS. 1 and 5E, a user may invoke data migration engine 116 using post-compare and report function 533, to receive and process data objects and information associated with migrated software code pertaining to both source database instance 120A and target database instance 120B.

At 804, to ensure that any data loss could be recovered after software code migration, an optional backup may be made for software code stored in the target database instance. For example, referring to FIGS. 1, and 5D, when migrate function 530 is selected, data migration engine 116 may be invoked to make a backup copy of at least some data objects and data associated with target database instance 120B to another database instance or database.

At 806, method 800 identifies which database objects will be impacted by the migrated software code. For example, method 800 may determine from one or more objects being migrated from the source database, which objects in the target database are to be impacted upon migration. The identification may be made by method 800 analyzing the data received at 802. For example, referring to FIGS. 1 and 5D, when migrate function 530 is selected, data migration engine 116 may be invoked to identify which objects in target database instance 120B will be impacted by the software code migration.

At 808, to ensure that data objects in the target database identified at 806 may be recovered, an optional backup may be made to such identified data objects located in the target database instance. For example, referring to FIGS. 1, and 5D, when migrate function 530 is selected, data migration engine 116 may be invoked to make a backup copy of at least some of the identified data objects and data associated with target database instance 120B to another database instance or database.

At 810, method 800 initiates the migration of the software code associated with the migration project from the source database instance to the target database instance. For example, as illustrated in FIGS. 1 and 5D, migration may be initiated by a user selecting code migrate function 530, invoking data migration engine 116 to migrate software code from source database instance 120A to target database instance 120B.

At 812, method 800 determines whether a post-comparison process, such as, for example, a post compare process performed by data migration engine 116, has been initiated. If the post-comparison process has been initiated, method 800 proceeds to 814. If the post-comparison process is not needed, or has not been initiated, method 800 proceeds to 822 described below.

At 814, method 800 performs a post-comparison process to determine whether the software code has been migrated successfully from the source database instance to the target database instance. In one implementation, the post-comparison process compares migration information pertaining to source database objects to target database objects in accordance with the post-migration validation rules to determine whether unacceptable and acceptable database changes, and acceptable and unacceptable non-data factors occurred during or upon completion of software code migration.

In one implementation, post-migration validation rules include rules pertaining to unacceptable data loss, acceptable data loss, unacceptable non-data values, and acceptable non-data values. For example, post-migration validation rules may include rules pertaining to acceptable and unacceptable destructive changes to database table rows and columns, changes to values within a database table, changes to access permissions, and the like, that may result in acceptable or unacceptable data loss which includes overwriting, deleting, or disassociation of data values associated with one or more database tables.

Such software post-migration validation rules may further include rules pertaining to other acceptable and unacceptable non-data factors related to whether the software code migration was successful including unacceptable or acceptable changes to database table naming conventions, types of software code allowed, version control, encryption types allowed, data transmission processes, passwords, usernames, etc., and may include other types of information such as whether migration approvals from third parties and other personnel associated with approving a software code migration process was received prior to software code migration.

Upon completion of 814, method 800 proceeds to 816 to generate a post-comparison report. At 816, method 800 generates a compare report used to provide users with data pertaining to the post-compare process described herein. For example, as illustrated in FIGS. 1, 2, and 5E, post-migration comparison and reporting may be initiated by a user selecting post-compare and report function 533, invoking data migration engine 116 to prepare one or more software code post-migration comparison reports, that may be accessed, as an example, using project migration report submenus 228.

Such post-compare report may contain information pertaining to data that may be used to determine unacceptable data loss, acceptable data loss, unacceptable non-data values, and acceptable non-data values. For example, such post-compare report may include information pertaining to acceptable and unacceptable destructive changes to database table rows and columns, changes to values within a database table, changes to access permissions, and the like, that resulted in acceptable or unacceptable data loss which includes, as an example, overwriting, deleting, or disassociation of data values associated with one or more database tables.

In addition, such post-compare report may further include information that may be used to determine other acceptable and unacceptable non-data factors related to whether the software code migration was successful or unsuccessful including unacceptable or acceptable changes to database table naming conventions, types of software code allowed, version control, encryption types allowed, data transmission processes, passwords, usernames, etc., and may include other types of information such as whether migration approvals from third parties and other personnel associated with approving a software code migration process was received prior to software code migration.

At 818, method 800 determines whether the software code migration was successful (e.g. pass) by analyzing data and information from 814 to determine whether any unacceptable data loss or unacceptable non-data values occurred during or upon completion of the software code migration. In one implementation, if method 800 determines from the analysis that no unacceptable data loss or unacceptable non-data values occurred, or unacceptable data loss or unacceptable non-data values were within an acceptance threshold, method 800 proceeds to 822. However, if method 800 determines from the analysis that at least one unacceptable data destruction or unacceptable non-data value occurred, or unacceptable data loss or one or more unacceptable non-data value exceeded the acceptance threshold, at 818, method 800 proceeds to 820 to set an error flag, and ends at 824.

At 822, method 800 builds the application on the target database instance. For example, as illustrated in FIGS. 1 and 5D, a user may select build function 536 by invoking data migration engine 116 to perform a software build using the migrated software code disposed on target database instance 120B associated with the software code migration project. Upon completion of the software build, method 800 ends at 824.

Figure 9:
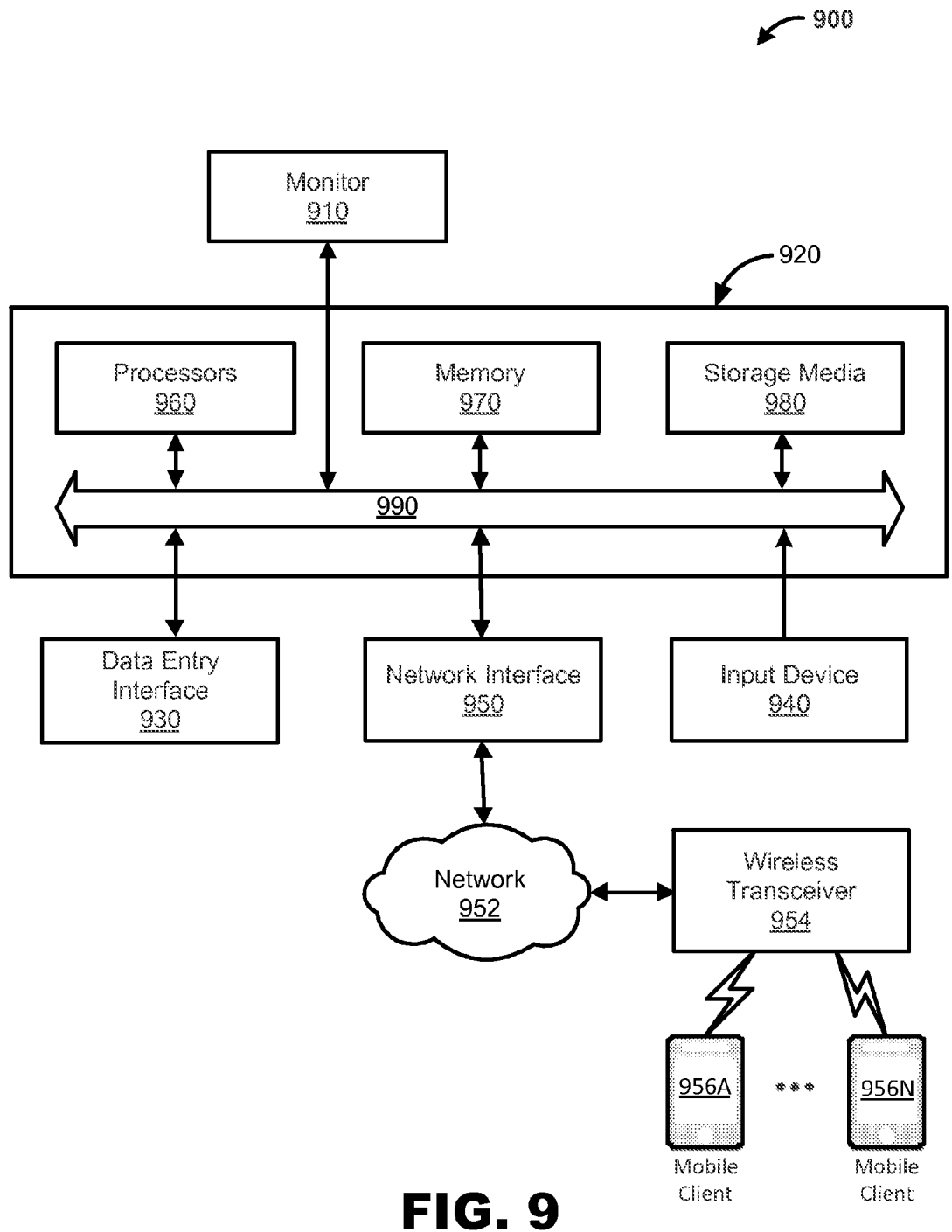
FIG. 9 is a high-level block diagram of an exemplary computer and communication system.

FIG. 9 is a block diagram of an exemplary computer system 900 for use with implementations described in FIGS. 1-8. Computer system 900 is merely illustrative and not intended to limit the scope of the claims. One of ordinary skill in the art would recognize other variations, modifications, and alternatives. For example, computer system 900 may be implemented in a distributed client-server configuration having one or more client devices in communication with one or more server systems.

In one exemplary implementation, computer system 900 includes a display device 910 such as a monitor 910, computer 920, a data entry device 930 such as a keyboard, touch device, and the like, a user input device 940, a network communication interface 950, and the like. User input device 940 is typically embodied as a computer mouse, a trackball, a track pad, wireless remote, tablet, touch screen, and the like. Moreover, user input device 940 typically allows a user to select and operate objects, icons, text, characters, and the like that appear, for example, on the monitor 910.

Network interface 950 typically includes an Ethernet card, a modem (telephone, satellite, cable, ISDN), (asynchronous) digital subscriber line (DSL) unit, and the like. Further, network interface 950 may be physically integrated on the motherboard of computer 920, may be a software program, such as soft DSL, or the like.

Computer system 900 may also include software that enables communications over communication network 952 such as the HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like.

Communication network 952 may include a local area network, a wide area network, a wireless network, an Intranet, the Internet, a private network, a public network, a switched network, or any other suitable communication network, such as for example Cloud networks. Communication network 952 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 952 may communicate to one or more mobile wireless devices 956A-N, such as mobile phones, tablets, and the like, via a base station such as wireless transceiver 954.

Computer 920 typically includes familiar computer components such as a processor 960, and memory storage devices, such as a memory 970, e.g., random access memory (RAM), storage media 980, and system bus 990 interconnecting the above components. In one embodiment, computer 920 is a PC compatible computer having multiple microprocessors, graphics processing units (GPU), and the like. While a computer is shown, it will be readily apparent to one of ordinary skill in the art that many other hardware and software configurations are suitable for use with the present invention. Memory 970 and Storage media 980 are examples of non-transitory tangible media for storage of data, audio/video files, computer programs, and the like. Other types of tangible media include disk drives, solid-state drives, floppy disks, optical storage media such as CD-ROMS and bar codes, semiconductor memories such as flash drives, flash memories, read-only-memories (ROMS), battery-backed volatile memories, networked storage devices, Cloud storage, and the like.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for interactively managing software code promotion amongst a plurality of database instances located on a network of servers, the method comprising:
 receiving software code from a source database instance, wherein the source database instance is distributed amongst the network of severs;

determining a target database instance for the software code, wherein the target database instance is distributed amongst the network of severs;

establishing a software code migration project by labeling the software code with a migration project identifier;

receiving a first set of data migration information pertaining to source database objects and source criteria associated with the software migration project;

receiving a second set of data migration information pertaining to target database objects and target criteria associated with the software migration project;

determining from a first comparison between the first set of data migration information and the second set of data migration information changes to the target database and software code migration project that will occur as a result of migrating the software code from the source database instance to the target database instance;

based at least in part on determining from the first comparison that a loss of data stored in the target database will not exceed a data loss threshold as a result of migrating the software code from the source database instance to the target database instance, migrating at least a portion of the software code from the source database instance to the target database instance; and generating a build script configured to execute the build in the target database instance for the software code migration project.

2. The method of claim 1, wherein the first set of data migration information and second set of data migration information comprises metadata pertaining to the database objects associated with the software code migration project.

3. The method of claim 1, wherein the first set of data migration information and the second set of data migration information comprises validation information pertaining to the software code migration project.

4. The method of claim 1, wherein the first comparison comprises determining from the changes to the target database relative to the data loss threshold which portions of the software code would produce an acceptable loss of data as a result of migrating the software code from the source database instance to the target database instance, and migrating the portion of the software code that would produce the acceptable loss of data.

5. The method of claim 1, wherein the first comparison comprises determining from an analysis of the source criteria and the target criteria against one or more migration validation rules which portions of the software code would produce at least one acceptable change to the software code migration project as a result of migrating the software code, and migrating the portion of the software code that would produce the at least one acceptable change to the software code migration project.

6. The method of claim 1, further comprising after migrating the software code from the source database instance to the target database instance performing a second comparison between the source database objects and the target database objects to determine whether data loss in the target instance exceeded the data loss threshold as a result of migrating the software code.

7. The method of claim 6, further comprising after migrating the software code from the source database instance to the target database instance determining from the second comparison of the software code migration project to migration validation criteria, whether changes to the software code migration project exceeded one or more of the migration validation criteria.

8. The method of claim 7, further comprising establishing a proxy agent configured to establish an encrypted link between the source database instance and the target database instance and perform the first comparison.

9. The method of claim 8, wherein the proxy agent is further configured to perform the second comparison.

10. The method of claim 8, wherein the proxy agent is further configured to determine which data objects will be affected by migrating the software code and creating a copy of the data objects that will be affected.

11. A tangible non-transitory storage medium including instructions executable by one or more servers of a server system for interactively managing software code migration in a computing environment, the computing environment including one or more computing devices in communication with a software application, wherein the software application executes software, wherein the software provides displayable information accessible to the one or more computing devices, the tangible storage medium including instructions for:

receiving software code from a source database instance, wherein the source database instance is distributed amongst the network of severs;

determining a target database instance for the software code, wherein the target database instance is distributed amongst the network of severs;

establishing a software code migration project by labeling the software code with a migration project identifier;

receiving a first set of data migration information pertaining to source database objects and source criteria associated with the software migration project;

receiving a second set of data migration information pertaining to target database objects and target criteria associated with the software migration project;

determining from a first comparison between the first set of data migration information and the second set of data migration information changes to the target database and software code migration project that will occur as a result of migrating the software code from the source database instance to the target database instance;

based at least in part on determining from the first comparison that a loss of data stored in the target database will not exceed a data loss threshold as a result of migrating the software code from the source database instance to the target database instance, migrating at least a portion of the software code from the source database instance to the target database instance; and generating a build script configured to execute the build in the target database instance for the software code migration project.

12. The storage medium of claim 11, wherein the first set of data migration information and second set of data migration information comprises metadata pertaining to the database objects associated with the software code migration project.

13. The storage medium of claim 11, wherein the first set of data migration information and the second set of data migration information comprises validation information pertaining to the software code migration project.

14. The storage medium of claim 11, wherein the first comparison comprises determining from the changes to the target database relative to the data loss threshold which portions of the software code would produce an acceptable loss of data as a result of migrating the software code from the source database instance to the target database instance, and migrating the portion of the software code that would produce the acceptable loss of data.

15. The storage medium of claim 11, wherein the first comparison comprises determining from an analysis of the source criteria and the target criteria against one or more migration validation rules which portions of the software code would produce at least one acceptable change to the software code migration project as a result of migrating the software code, and migrating the portion of the software code that would produce the at least one acceptable change to the software code migration project.

16. The storage medium of claim 11, further comprising after migrating the software code from the source database instance to the target database instance performing a second comparison between the source database objects and the target database objects to determine whether data loss in the target instance exceeded the data loss threshold as a result of migrating the software code.

17. The storage medium of claim 16, further comprising after migrating the software code from the source database instance to the target database instance determining from the second comparison of the software code migration project to migration validation criteria, whether changes to the software code migration project exceeded one or more of the migration validation criteria.

18. The storage medium of claim 17, further comprising establishing a proxy agent configured to establish an encrypted link between the source database instance and the target database instance and perform the first comparison.

19. The storage medium of claim 18, wherein the proxy agent is further configured to perform the second comparison.

20. The storage medium of claim 18, wherein the proxy agent is further configured to determine which data objects will be affected by migrating the software code and creating a copy of the data objects that will be affected.

* * * * *

UNITED STATES PATENT AND TRADEMARK OFFICE
CERTIFICATE OF CORRECTION

PATENT NO. : 9,778,923 B2  
APPLICATION NO. : 14/824212  
DATED : October 3, 2017  
INVENTOR(S) : Kochhar et al.

Page 1 of 1

It is certified that error appears in the above-identified patent and that said Letters Patent is hereby corrected as shown below:

In the Drawings

On sheet 3 of 13, in FIG. 3, under Reference Numeral 346, Line 1, delete "C:psreports" and insert -- C:\psreports --, therefor.

In the Specification

In Column 7, Line 35, delete "ORALCE" and insert -- ORACLE --, therefor.

In Column 7, Line 41, delete ""CApsreports,"" and insert -- "C:\psreports," --, therefor.

In Column 7, Line 43, delete ""D: \prod,"" and insert -- "D:\prod," --, therefor.

In Column 7, Line 44, delete ""D: \workspace,"" and insert -- "D:\workspace," --, therefor.

In Column 15, Line 10, after "228" insert -- . --.

Signed and Sealed this  
Twenty-fourth Day of July, 2018

Andrei Iancu  
*Director of the United States Patent and Trademark Office*